Aug. 15, 1939.   R. H. GEORGE   2,169,726
OSCILLOGRAPH APPARATUS
Original Filed Sept. 14, 1929   3 Sheets-Sheet 1
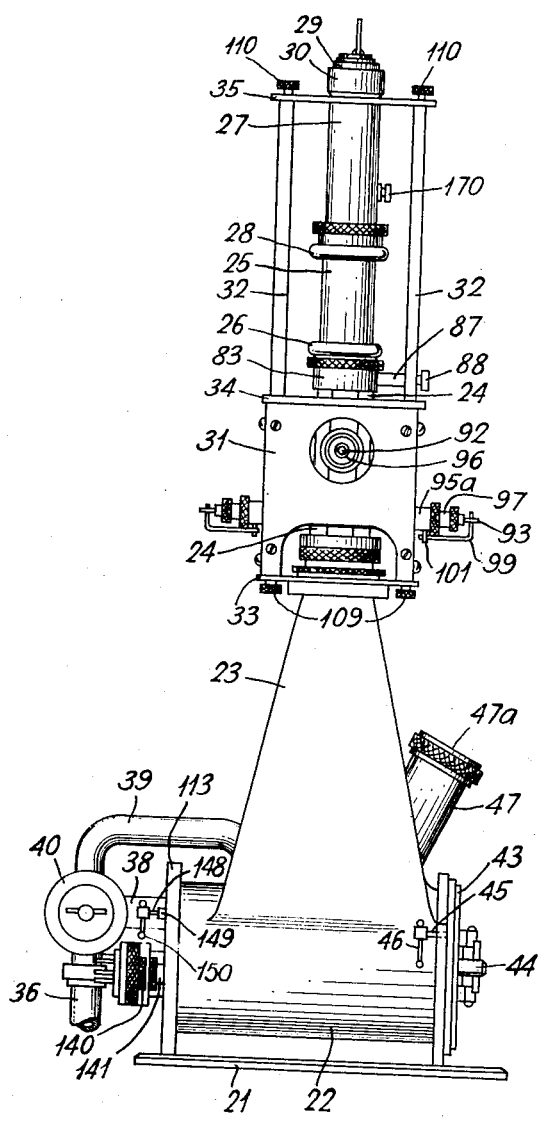
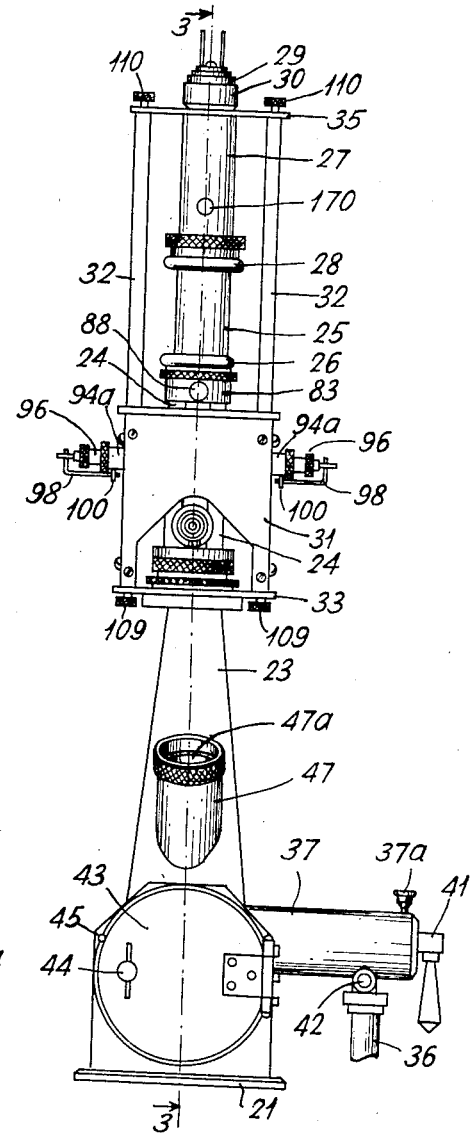
INVENTOR
ROSCOE H. GEORGE
BY H.S. Grover
ATTORNEY

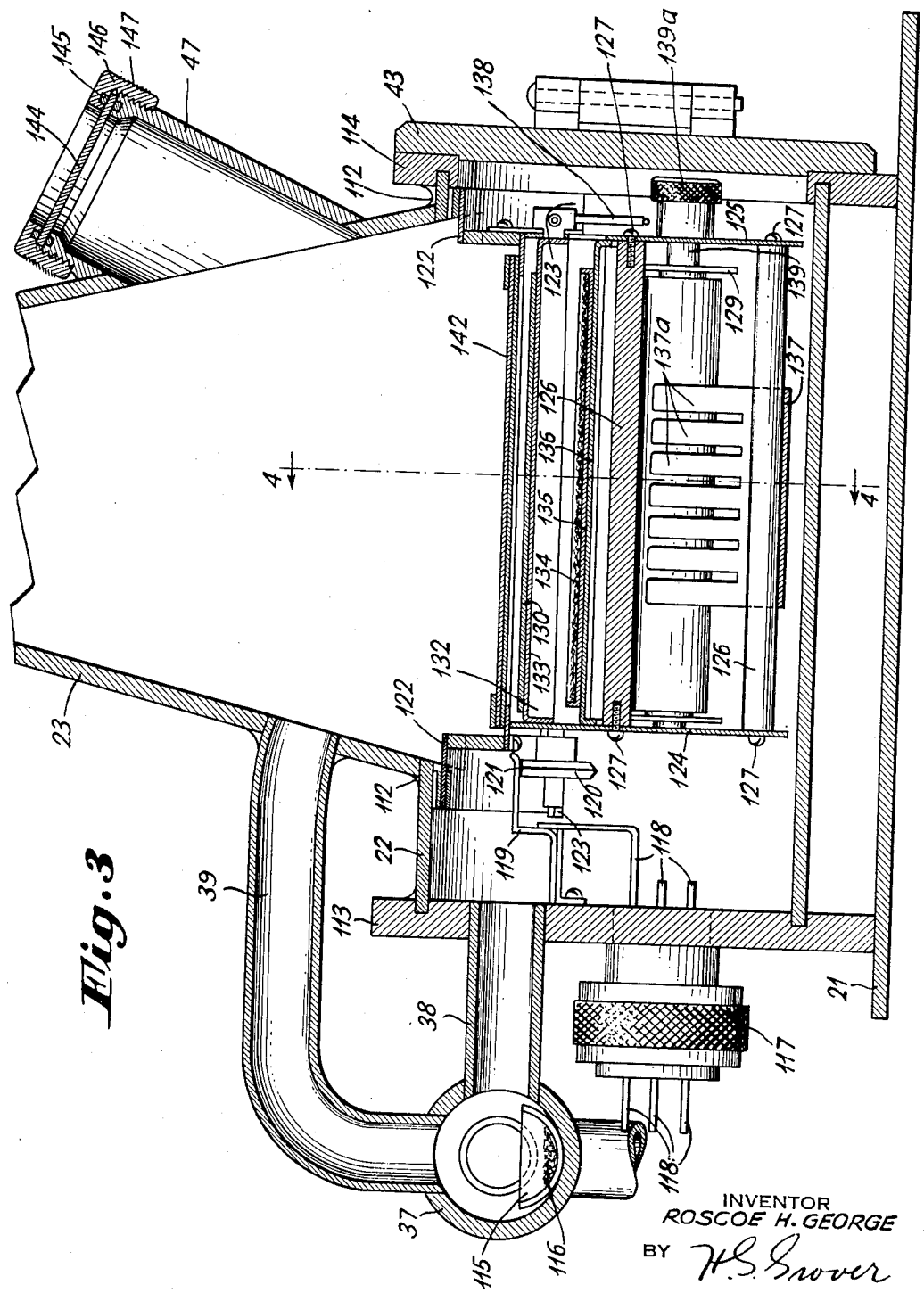

Patented Aug. 15, 1939

2,169,726

UNITED STATES PATENT OFFICE 2,169,726

OSCILLOGRAPH APPARATUS

Roscoe Henry George, West Lafayette, Ind., assignor to Radio Corporation of America, a corporation of Delaware Original application September 14, 1929, Serial No. 392,591. Divided and this application July 10, 1937, Serial No. 152,951

2 Claims. (Cl. 250—141)

This invention, which forms a divisional part of my Patent No. 2,086,546 issued July 13, 1937, relates to oscillographs and methods of operating the same and has particular relation to cathode ray oscillographs and systems of electrical connections therefor, whereby transient electrical phenomena and the like may be accurately and efficiently recorded or observed.

A very urgent demand for further knowledge of lightning and other transient phenomena, and other high-frequency electrical phenomena in general, has resulted in the development of three general types of cathode-ray oscillographs for such investigations. These types are the high-voltage cold-cathode type, the low-voltage hot-cathode type and the medium-voltage hot-cathode type.

The oscillograph constituting the invention has been designed and developed with a particular view to gaining the necessary photographic sensitivity through the use of a high-intensity cathode ray or beam at a minimum beam voltage. One of the principal problems, then, has been to devise satisfactory means for producing and focusing a high-intensity beam over a sufficient range of beam voltages to insure the necessary photographic sensitivity. The solution of this problem constitutes one of the major advantages of the invention.

It is accordingly an object of the present invention to provide and produce an instrument of the above indicated character that will be reliable for the purpose intended and by which a recording strip may be suitably positioned and fed to record the desired phenomena.

Further objects of the invention are to provide oscillograph apparatus and a system for controlling the same which will provide for recording transients or other types of signals of extremely short duration.

Still other objects and advantages of the invention are those which were set forth in the parent application of which this is a divisional and to which reference may be made for a complete understanding of the entire apparatus not specifically disclosed in this divisional application.

The invention has been illustrated in one of its preferred forms by the accompanying drawings, where:

Figure 1 is a side elevational view of an assembled instrument constructed according to the invention;

Figure 2 is a front elevational view of the instrument shown by Figure 1;

Figure 3 is an enlarged fragmentary vertical sectional view taken on the line 3—3 of Figure 2.

Figure 4:
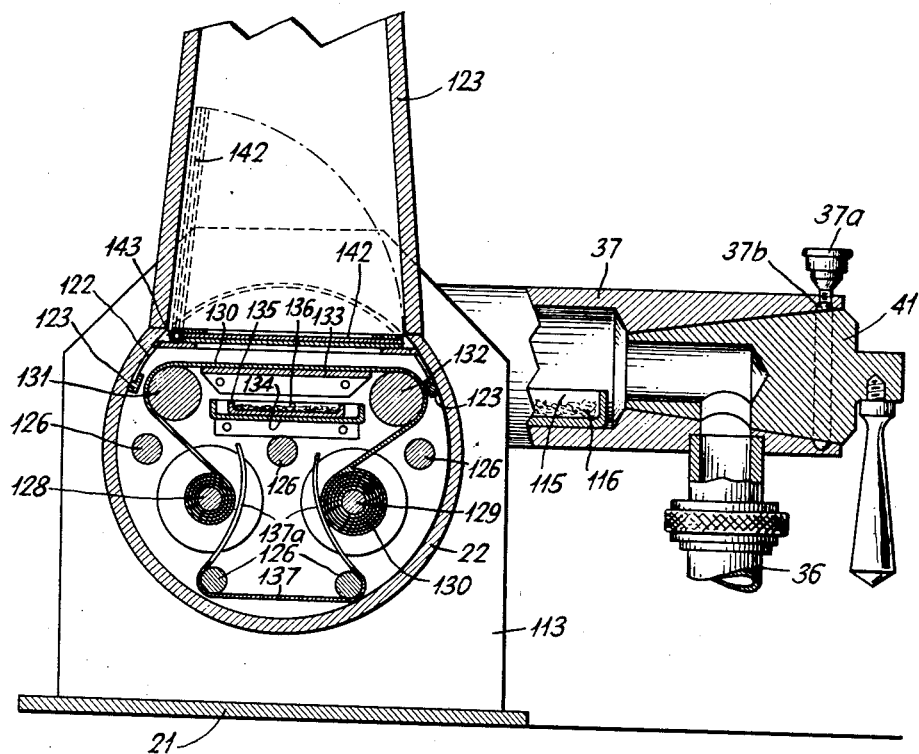
Figure 4 is a fragmentary vertical sectional view taken on the line 4—4 of Figure 3.

The general elements of construction of the preferred embodiment of the invention are best shown in Figs. 1 and 2 of the drawings, in which it may be seen that a base plate 21 supports a horizontally extending cylindrical chamber 22. From the upper portion of the chamber 22 a tapered casing portion 23 extends upwardly to support a vertically extending casing portion 24, the exterior of which is shown as being octagonal in cross section. To the upper extremity of the casing portion 24, a cylindrical casing portion 25 of insulating material is secured by means of a sleeve nut 26, and to the upper extremity of this casing portion 25 another cylindrical casing portion 27 is, in turn, secured by means of a sleeve nut 28. The upper extremity of this casing portion 27 is closed by an insulating cap member 29 that is secured in position by a sleeve nut 30.

The casing portions 24 and 27 are of metal and are adapted to have relatively high potential conductors connected thereto, and for this reason it is desirable to surround the same by protective members, such as insulating side plates 31 and vertical rods 32, which latter are partly of metal and partly of insulating material, as will appear hereinafter. These side plates and rods are supported by a metallic bottom plate 33, a metallic intermediate plate 34 and a top plate 35 of insulating material, which plates are supported upon the main casing of the instrument in a manner which will be better understood upon reference to the detailed drawings and description thereof hereinafter.

The entire casing of the apparatus is adapted to be evacuated to facilitate the desired operation of the instrument and for this purpose a connection 36 is provided to extend to a suitable vacuum pump. The connection 36 is connected to the casing portions 22 and 23 through a drying chamber 37 and two pipe or conduit sections 38 and 39. One end of the drying chamber 37 is provided with a removable cap 40 to permit the insertion of a container of drying material, such as a suitable hygroscopic chemical or the like, and the opposite end of this chamber is provided with a valve 41 for controlling the connection of the instrument casing to the vacuum pump through the connection 36. The latter connection preferably includes a second valve 42 for connecting the interior of the instrument casing to the atmosphere in order to break the vacuum within said casing when desired.

One end of the cylindrical portion 22 of the casing is provided with a hinged door 43 adapted to be tightly sealed by a suitable gasket or otherwise and to be opened by means of a handle 44. Since this door is held very tightly closed by the external atmospheric pressure when the interior of the casing is evacuated, it is also desirable to provide a releasing screw 45, which extends through a screw threaded hole in a projecting portion of the end wall of the casing portion 22 and abuts against the inner surface of the door 43 near the periphery thereof. A pin 46 extends through a hole in the head of the screw 45, in order that this screw may be turned manually to effect a slight opening of the door 43 when the vacuum within the casing has been broken. When the door 43 is thus moved a slight distance it may be readily opened by means of the handle 44.

A tubular member 47 is secured to one side of the tapered casing portion 23 and extends angularly therefrom in such direction that a viewing screen within the cylindrical casing portion 22 may be observed through a suitable window in the outer extremity of said tubular member. The structural details of such viewing screen and observing window will appear hereinafter. It may be noted here, however, that a cover 47a prevents light from entering the casing through said window when the latter is not in use.

Referring now to Figs. 3 and 4, it will be seen that the lower extremity of the tapered casing portion 23 registers with an aperture in the top of the horizontally extending cylindrical casing portion 22 and is permanently and tightly secured to said casing portion 22 by soldering or brazing as indicated at 112.

The ends of the casing portion 22 are respectively supported by vertical end plates 113 and 114 which are suitably secured to the ends of said casing portion by soldering or brazing to form perfectly air-tight joints. The end plate 113 closes the lefthand end of the casing 22, as viewed in Fig. 3 and is apertured to receive the inner extremity of the pipe or conduit 38, the other extremity of which connects with the interior of the drying chamber 37. The pipe or conduit 39 similarly connects the drying chamber 37 with the casing portion 23, it being understood that both of the pipes or conduits 38 and 39 are brazed or soldered to the members to which they are connected at their respective extremities to form air-tight connections. The provision of the two pipes or conduits 38 and 39 insures complete and rapid evacuation of all parts of the casing without causing the air or other gases therefrom to encounter any unnecessary obstructions.

A tray or open container 115 is disposed within the drying chamber 37 and is adapted to hold a quantity of phosphorous pentoxide or other hygroscopic material 116 to prevent the passage of any moisture from the interior of the instrument (particularly from photographic films) into the pumping apparatus, where deleterious results would be caused thereby. The interior of the drying chamber 37 is connected through the valve 41 as best shown in Fig. 4 with the connection 36 which extends to the vacuum pump (not shown), as previously stated. This valve is sealed to prevent any leakage of air into the instrument at this point, by means of grease supplied by a grease cup 37a to an interior annular groove 37b near the outer extremity of the member 37 surrounding the body portion of the valve 41.

A sealing and insulating gland 117 is also connected to the end plate 113 for the purpose of permitting electrical conductors 118 to be extended from the exterior of the casing into the interior thereof in electrically insulated and air-tight relation thereto. These conductors may be utilized for making connections to vacuum indicating lamps or devices and other circuits which it may be found desirable to utilize within the casing of the instrument, particularly in the portion 22 thereof. One of the conductors 118 is shown as being connected to a contact member 119 bearing upon the periphery of a metallic disc 120 having an insert 121 of insulating material at a predetermined point therein. These parts may be utilized in connection with a film-winding mechanism, as will be more fully described hereinafter.

The end plate 114 of the chamber portion 22 is apertured to permit the insertion and removal of the above mentioned film-winding mechanism, and this aperture is adapted to be closed and tightly sealed by the hinged door 43, as previously described.

The film-winding and carrying mechanism is constructed as a removable unit adapted to be supported by a frame 122, which is constituted by a piece of sheet metal forming a portion of a cylinder and apertured substantially in register with the bottom of the casing portion 22. The frame member 122 is located at the upper portion of the film-winding and supporting mechanism and is adapted to fit within the interior of the horizontally extending cylindrical casing portion 22 and to be supported upon rabetted or grooved longitudinal rods 123 secured to the inner surface of this portion of the casing. With this manner of support it will be seen that the film mechanism may be slid into the casing portion 22 through the opening in the end wall 114 when the door 45 is open and that this mechanism will be accurately held in the desired position for the purpose of obtaining photographic records of the movements of the cathode ray, as will appear hereinafter.

Suspended from the supporting frame 122 are two end plates 124 and 125 between which a plurality of supporting rods 126 extend. The respective extremities of the rods 126 are secured to the end plates 124 and 125 by screws 127, or other suitable means, and in this manner a rigid framework for the operative parts of the film mechanism is eventuated. Film-winding rolls or spools 128 and 129 are provided with suitable pintles journaled in the end plates 124 and 126 and a photographic film 130 is adapted to be wound from one of these rolls or spools onto the other in the operation of the instrument. The film extends between the two rolls or spools 128 and 129 over two idler rolls 131 and 132, which are also journaled in the end plates 124 and 125.

Between the idler rolls 131 and 132 a horizontally extending plate or table 133 is disposed for supporting an intermediate portion of the film in register with the aperture through the top of the casing portion 22 and with the bottom of the casing portion 23. This plate or table 133 is rigidly secured at its opposite extremities to the end plates 124 and 126, and thus forms a solid support for the portion of the film 130 upon which the photographic records are made. Beneath the plate or table 133 a fixed tray 134 is disposed, this tray also being rigidly secured at its opposite extremities to the end plates 124 and 125. This tray is adapted to support a removable tray 135 carrying a quantity of phosphorous pentoxide or other gyroscopic material 136 for absorbing any moisture which remains in the film 130 when the same is placed in the casing portion 22.

A resilient member 137 is supported by two of the rods 126 near the bottom of the end plates 124 and 125 and extends inwardly and upwardly past the film-winding rolls or spools 128 and 129. The upwardly extending portions of the member 137 are comb-like to form a plurality of resilient prongs or fingers 137a which bear firmly against the film 130 as it is wound upon or unwound from the rolls or spools 128 and 129. The pressure exerted upon the film 130 by these resilient prongs 137a maintains the desired degree of tautness in the portion of the film between the two rolls or spools 128 and 129.

A handle member 138 is suitably secured to the end plate 125 to facilitate insertion and removal of the film mechanism into and out of the chamber 22. The righthand extremity of the film-winding roll or spool 129 is pivotally supported on a pintle 139 which may be maintained in its operative position as illustrated by any suitable end well known means, such, for example, as an internal coil spring, and which may be retracted by means of a knurled knob 139a to permit removal and replacement of the spool 129. The righthand extremity of the spool 128 is similarly supported by a corresponding retractible pintle (not shown). The lefthand extremity of the roll or spool 128 is adapted to be engaged by suitable turning prongs or fingers (not shown) connected to a knurled knob 140 (Fig. 1), the spindle of which extends through the end wall 113 through an air-tight sealing gland 141, to permit winding of the film from the roll or spool 129 onto the roll or spool 128 from the outside of the casing of the instrument while the inside of said casing is evacuated to place the instrument in condition for operation.

By means of this mechanism, it will be understood that successive portions of the film 130 may be brought into register with the aperture in the top of the casing portion or film chamber 22, through which the cathode ray or beam enters said chamber. This operation may be performed without breaking the vacuum within the casing of the instrument, and thus a considerable number of photographic records may be made in a short time without extended intermediate delays, which would be occasioned if it were necessary to open the casing each time the film was to be changed, and therefore to reestablish the vacuum after each film change.

The purpose of providing the contact disc 120 and cooperating contact finger 119 will now appear. The disc 120 is carried by and secured to the lefthand extremity or pintle of the idler roll 132, as shown in Fig. 3, whereby this disc rotates with said idler roll. This roll is moved in unison with the movement of the film 130 by reason of the frictional engagement between the film and roll, since the intermediate portion of the film between the two winding rolls 128 and 129 is always maintained in a taut condition, as previously described. Therefore, when the film is wound from the roll 129 onto the roll 128 by manipulation of the knurled knob 140, the contact disc 120 is rotated to a degree that is exactly proportional to the distance through which any given point of the film moves. The circumference of the roll 132 is such that one complete revolution thereof corresponds to a movement of the film 130 through a distance equal to the length of film utilized at each exposure thereof.

The initial exposure setting of the film is made with the contact finger 119 in contact with the insulating insert 121 in the disc 120. When the film is moved toward the position which it is to occupy during its next exposure, the contact finger 119 contacts with the conducting portions of the disc 120 to establish an electrical circuit between one of the insulated conductors 118 and the metallic frame of the instrument. This condition may be indicated by connecting the said one of the conductors 118 and the frame of the instrument in series with a lamp or other indicating device, which may be conveniently located for that purpose, and which is not shown herein in order to avoid unnecessary complication of the drawings. When the desired movement of the film 130 has been effected, the contact finger 119 again engages the insulating insert 121 in the disc 120 and interrupts the indicating circuit, it being understood that the contact finger 119 is otherwise suitably insulated from the framework or casing of the instrument. Upon extinguishment of the lamp or corresponding indication of any other indicating device that may be utilized, the operator is informed that the film has been moved through the desired distance and that a fresh portion thereof is ready for exposure. It is also contemplated that the contact mechanism comprising the finger 119 and the disc 120 having the insulating insert 121 therein may be utilized to effect automatic operation of the film by an electrical motor or other suitable means in response to any desired condition indicating that a record has been made on the exposed portion of the film and that a fresh portion of the film should be brought into the field of exposure. The essential element of this feature of the invention, however, is in associating the indicating mechanism comprising the disc 120 with an idler roll, such as the roll 132, that is rotated through a predetermined degree for any given movement of the film 130, while the degree of rotative movement of the winding rolls 128 and 129 is variable depending upon the amount of film which has been wound from one of these rolls onto the other.

For the purpose of permitting visual inspection of the movements of the cathode ray or beam under the influence of the phenomena being observed, a phosphorescent or fluorescent screen 142 is hinged about a horizontal axis at 143 to a fixed portion of the frame 122 of the film mechanism. This screen is adapted to be rotated about the axis 143 between the full line and dotted line positions indicated in Fig. 4. In the dotted line position, as shown in this figure, the screen is entirely out of the path of the cathode ray or beam, which therefore impinges on the film 130 and is photographically recorded thereon. When the screen 142 occupies the position indicated in full lines in Figs. 8 and 9, it is horizontally disposed above the exposed portion of the film 130 in the path of the cathode ray beam, and the upper surface thereof may be viewed through a glass window 144 that is provided near the outer extremity of the tubular member 47, as indicated in Fig. 3. The window 144 is tightly sealed in the outer end of the tubular member 147 by means of suitable gaskets 145 and a flanged securing sleeve 146 that is internally screw-threaded to cooperate with corresponding external screw threads at the outer extremity of the tubular member 47. The outer surface of the flanged sleeve 146 is suitably knurled, as indicated at 147, whereby it may be tightly screwed onto the end of the member 47 to form a perfectly air-tight connection between said member 47 and the window 144. The member 47 is suitably fixed to a side wall of the tapered casing portion 43 in register with an aperture therein by means of soldering or brazing to form an air-tight connection at this point.

It will be seen from an examination of Fig. 3 that the viewing screen 142 may be clearly viewed through the window 144 when said screen is in its operative position as shown. The screen or the mounting plate therefor also serves in this position as a light-proof shutter to protect the film 130 from exposure to light entering the casing through the window 144. It will be understood, of course, that the cap or cover 47a previously mentioned with reference to Figs. 1 and 2 is used to cover the window 144 when the movements of the cathode ray or beam are being recorded on the film 130 instead of being viewed on the screen 142. This cap or cover prevents the entrance of light into the film chamber through the window 144, which light might affect the sensitized film 130. The provision of such a cap may not be necessary, however, where the window 144 is composed of colored glass which will not admit any light that will affect the film 130, but which will permit the observation of the path of movement of the cathode ray or beam as indicated on the screen 142.

The screen 142 is adapted to be actuated between its operative and inoperative positions by means of a pin 148 extending through an airtight sealing gland 149 in the end wall 113 of the film chamber 22, as shown in Fig. 1. The outer extremity of the pin 148 is provided with an operating handle 150, and the inner extremity of this pin is adapted to engage the axial portion 143 of the screen 142 in a suitable operative manner. Thus, the instrument may be adapted either for visual observation or for photographic recording of the movements of the cathode ray or beam by simply manipulating the handle 150 on the outside of the casing. It will be understood that the screen 142 is so mounted that it will remain in either of its two positions when it has been actuated into such position by the manipulation of the handle 150.

The specific apparatus and means by which the electron beam is developed, focused and controlled has been set forth in my Patent No. 2,086,546, issued July 13, 1937 and above referred to, and reference may be made to that disclosure for a complete understanding of those portions of the invention which have not been specifically illustrated or described herein view of the divisional character of this application.

Having now described the invention, what is claimed and desired to be secured by Letters Patent is the following:

1. In a cathode ray oscillograph, an evacuated casing, a passage for communication with the interior of the casing, means for connecting the passage to said casing including a valve comprising a body member having a tapered bore, a port in said body member extending radially with respect to the bore, a tapered plug member rotatable within said body and having passages to register with the bore of the body member and said port, an internal groove in the bore of the body member in a plane normal to the axis of the bore and situated between said port and the end of the body member whereby an air-tight grease seal may be produced and whereby the plug may be retained in position by atmospheric pressure against the end thereof.

2. In a cathode ray oscillograph, an evacuated casing, a passage for connecting with the interior of the casing, means for connecting the passage to said casing including a valve comprising a body member having a tapered bore, a port in said body member extending radially with respect to the bore, a tapered plug member rotatable within said body and having passages to register with the bore of the body member and said port, and an annular recess in the surface of the bore whereby a lubricant may be introduced to produce an air-tight seal, the plug being retained in position by atmospheric pressure.

ROSCOE HENRY GEORGE.